Jan. 15, 1929. 1,698,978

C. B. WILLIAMS

CUSPIDOR FOR VEHICLES

Filed May 4, 1928

INVENTOR.
Charlis B. Williams
BY
ATTORNEY.

Patented Jan. 15, 1929.

1,698,978

UNITED STATES PATENT OFFICE.

CHARLIS B. WILLIAMS, OF DETROIT, MICHIGAN.

CUSPIDOR FOR VEHICLES.

Application filed May 4, 1928. Serial No. 274,979.

My invention relates to a new and useful improvement in a cuspidor for vehicles intended primarily for mounting in the floor of a vehicle and having a cover lying flush therewith.

It is an object of the present invention to provide in a vehicle such as an automobile and the like a cuspidor which will be readily available for use and at the same time form little obstruction in the vehicle.

It is another object of the invention to provide in a cuspidor of this class swingably mounted covers which may be easily moved to open position and which, when in closed position, will serve to conceal the cuspidor and lie substantially flush with the floor of the vehicle body.

It is another object of the invention to provide a cuspidor of this class having a swingably mounted bottom and provided with means accessible from the interior of the vehicle for swinging the bottom to open and closed position.

It is another object of the invention to provide a cuspidor having a swingably mounted bottom and provided with means for sealing the bottom thereof in watertight condition.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention showing it applied.

Figure 1:
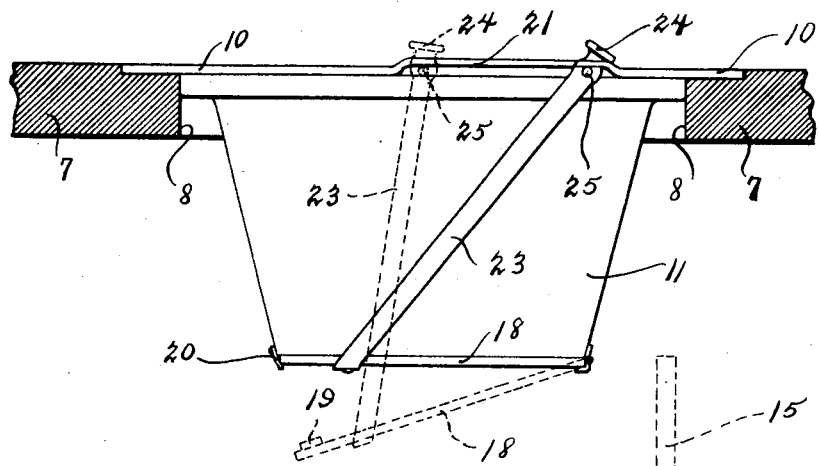

Formed in the body 7 of the vehicle is a recess 8. In the upper surface of the body 7 around the recess 8 is a recess 9 in which engages a flange 10 formed on the conical shaped cuspidor body 11, this flange being provided with a downwardly offset portion 12 to provide the vertically extending ring 13 which engages the inner surface of the recess or opening 8.

Figure 2:
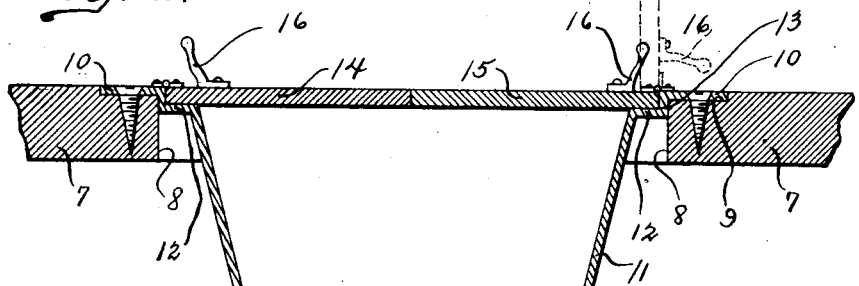
Fig. 2 is a central sectional view of the invention.
Figures 3, 4:
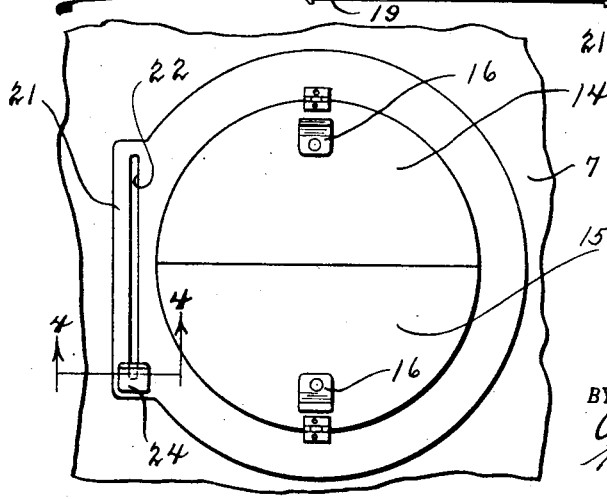
Fig. 3 is a top plan view of the invention.
Fig. 4 is a fragmentary enlarged sectional view taken on line 4—4 of Fig. 3.

In the drawings I have shown the cuspidor as formed conical and a pair of semicircular covers 14 and 15 are provided as closures for the cuspidor, each of these covers being swingably mounted on the floor 10. Projecting upwardly from each of the covers is an inclined arm 16 which may be engaged by the foot of the occupant of the vehicle so as to swing the cover into open position, as shown in dotted lines in Fig. 2.

The bottom of the cuspidor main body 11 is open and provided with an inwardly projecting flange 17 which is positioned slightly above the lower edge of the main body. Swingably mounted at one side to the lower edge of the main body is the bottom 18 which is adapted when moved to closed position, as shown in full lines in Fig. 2 to compress a gasket 19 against the undersurface of the flange 17, thus rendering the cuspidor leak-proof as to water. A spring clip 20 is mounted on the main body 11 at the lower edge thereof to engage the free end of the bottom 18. The flange 10 is bulged outwardly at one side to provide the elongated strip 21 in which is formed the elongated slot 22. Connected at one end to the bottom 18 is an arm 23, the other end of which is projected through the slot 22 and provided with a head 24. Extended through the arm 23 is a pin 25 adapted to engage the undersurface of the strip 21 which, as shown in Fig. 1, is upwardly offset from the main body of the flange 10.

The construction is such that upon a movement of the bar 23 to the position shown in dotted lines in Fig. 1, the bottom 18 will be swung to the dotted line position, so that the contents of the cuspidor 11 may be discharged therefrom. When the bottom 18 is in the open position a flushing or washing of the cuspidor may be effected by a simple splashing operation.

With a cuspidor such as described mounted in a vehicle a convenience is afforded, both for expectorating and other purposes. It is particularly useful at times when children are being conveyed over long distances in the vehicle as a ready relief convenience is thus afforded.

While I have illustrated and described the preferred form of my invention, I do not wish to limit myself to the precise details of structure shown, but desire to avail myself of such variations and modifications as come within the scope of the appended claims.

Having thus described my invention, what I claim as new and desire to secure by Letters Patent is:

1. In combination with a vehicle having a floor provided with an opening formed therein, a container positioned in said opening and projecting below said floor; an outwardly projecting flange on the upper end of said container and engaging the upper surface of said floor for supporting said container; an outwardly bulged portion on said flange upwardly offset and provided with an elongated slot, the lower end of said container being open; a bottom swingably mounted on said container for closing said lower end; and means connected to said bottom and projected through said slot and adapted upon movement longitudinally of said slot for moving said bottom to open and closed position.

2. In combination with a vehicle having a floor provided with an opening formed therein, a container positioned in said opening and projecting below said floor; an outwardly projecting flange on the upper end of said container and engaging the upper surface of said floor for supporting said container; an outwardly bulged portion on said flange upwardly offset and provided with an elongated slot, the lower end of said container being open; a bottom swingably mounted on said container for closing said lower end; means connected to said bottom and projected through said slot and adapted upon movement longitudinally of said slot for moving said bottom to open and closed position; a flange projecting inwardly of said container slightly within the lower end thereof; and a gasket engaging the undersurface of said flange and engageable over the inner surface of said bottom upon movement of the same to closing position for rendering said container watertight.

In testimony whereof I have signed the foregoing specification.

CHARLIS B. WILLIAMS.